(12) United States Patent
Ozluturk

(10) Patent No.: US 6,341,215 B1
(45) Date of Patent: *Jan. 22, 2002

(54) GLOBAL CHANNEL POWER CONTROL TO MINIMIZE SPILLOVER IN A WIRELESS COMMUNICATION ENVIRONMENT

(75) Inventor: Fatih M. Ozluturk, Port Washington, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/665,865

(22) Filed: Sep. 20, 2000

Related U.S. Application Data

(63) Continuation of application No. 09/196,808, filed on Nov. 20, 1998, now Pat. No. 6,181,919, which is a continuation of application No. 08/797,989, filed on Feb. 12, 1997, now Pat. No. 5,842,114.

(51) Int. Cl.[7] .................................................. H04B 7/00
(52) U.S. Cl. ........................................ 455/69; 455/522
(58) Field of Search ........................... 455/68, 69, 70, 455/550, 560, 561, 526, 522, 126, 127, 115; 370/321

(56) References Cited

U.S. PATENT DOCUMENTS

| | | |
|---|---|---|
| 5,265,119 A | 11/1993 | Gilhousen et al. |
| 5,267,262 A | 11/1993 | Wheatley, III |
| 5,345,598 A | 9/1994 | Dent |
| 5,375,140 A | 12/1994 | Bustamante et al. |
| 5,446,756 A | 8/1995 | Mallinckrodt |
| 5,491,837 A | 2/1996 | Haartsen |
| 5,715,526 A | 2/1998 | Weaver, Jr. et al. |
| 5,839,056 A | 11/1998 | Hakkinen |
| 5,842,114 A | 11/1998 | Ozluturk |
| 5,870,393 A | 2/1999 | Yano et al. |
| 5,873,028 A | 2/1999 | Nakano et al. |
| 5,991,284 A | 11/1999 | Willenegger et al. |
| 5,991,627 A | 11/1999 | Honkasalo et al. |
| 5,991,636 A | 11/1999 | Won et al. |

FOREIGN PATENT DOCUMENTS

| | | |
|---|---|---|
| WO | WO9533313 | 12/1995 |
| WO | WO9702665 | 1/1997 |
| WO | WO9747094 | 12/1997 |

*Primary Examiner*—Thanh Cong Le
(74) *Attorney, Agent, or Firm*—Volpe and Koenig, P.C.

(57) ABSTRACT

A system which dynamically adjusts the power of signals transmitted from a wireless base station over global channels to minimize spillover to other communication cells monitors the total transmit power of the base station and dynamically adjusts the global channel transmit power as a function of the total transmit power of the base station as measured at the base station.

9 Claims, 4 Drawing Sheets

GLOBAL CHANNEL POWER CONTROL TO MINIMIZE SPILLOVER IN A WIRELESS COMMUNICATION ENVIRONMENT

This application is a continuation of U.S. patent application Ser. No. 09/196,808, U.S. Pat. No. 6,181,919 which was filed on Nov. 20, 1998, which is a continuation of U.S. patent application Ser. No. 08/797,989, which was filed on Feb. 12, 1997, now U.S. Pat. No. 5,842,114.

BACKGROUND OF THE INVENTION

1. Field of the Invention

The present invention relates generally to wireless local loop and cellular communication systems. More particularly, the present invention relates to a wireless communication system which dynamically adjusts the power of signals transmitted over global channels from a base station to minimize power spillover to adjacent communication cells.

2. Description of the Related Art

Wireless communication systems have rapidly become a viable alternative to wired systems due to their inherent advantages. Wireless systems enable subscribers to freely move throughout the operating range of a service provider and even into the territory of other service providers while using the same communication hardware. Wireless communication systems are also utilized for applications where wired systems are impractical, and have become an economically viable alternative to replacing aging telephone lines and outdated telephone equipment.

One of the drawbacks with wireless communication systems is the limited amount of available RF bandwidth. There is a constant desire to improve the efficiency of these systems in order to increase system capacity and meet the rising consumer demand. A factor that degrades the overall capacity of wireless communication systems is signal power spillover between adjacent cells or base stations. This occurs when the power of signals transmitted by a base station in a particular cell exceeds the boundary of that cell, otherwise known as he operating range. The spillover becomes interference to adjacent cells and degrades the efficiency of the system. Accordingly, minimizing spillover is one of the most important issues in wireless communications system design.

Forward power control (FPC) is used to minimize spillover by adjusting the power level of signals transmitted from the base station to subscriber units on assigned channels. The FPC operates in a closed loop wherein each subscriber unit continuously measures its received signal-to-noise ratio and transmits an indication back to the base station of whether the base station should increase or decrease the transmit power to that subscriber unit. The closed loop algorithm assists in maintaining the transmit power level from the base station at a minimum acceptable level, thereby minimizing spillover to adjacent cells.

FPC, however, cannot adjust the power level for global channels such as the pilot signal, broadcast channel or paging channel. Since there is no closed loop algorithm that operates on these channels, the global channel transmit power level for the worst case scenario is typically used. The power level is generally more than what is required for most subscriber units, resulting in spillover to adjacent cells.

There have been prior attempts to overcome the problem of spillover. U.S. Pat. No. 5,267,262 (Wheatley, III) discloses a power control system for use with a CDMA cellular mobile telephone system including a network of base stations, each of which communicates with a plurality of subscriber units. Each base station transmits a pilot signal which is used by the mobile units to estimate the propagation loss of the pilot signals. The combined power of all base station transmitted signals as received at a mobile unit is also measured. This power level sum is used by the mobile units to reduce transmitter power to the minimum power required. Each base station measures the strength of a signal received from a mobile unit and compares this signal strength level to a desired signal strength level for that particular mobile unit. A power adjustment command is generated and sent to the mobile unit which adjusts its power accordingly. The transmit power of the base station may also be increased or decreased depending upon the average noise conditions of the cell. For example, a base station may be positioned in an unusually noisy location and may be permitted to use a higher than normal transmit power level. However, this is not performed dynamically, nor is the power correction based upon the total transmit power of the base station.

Accordingly, there exists a need for an effective method for controlling the power level of global channels transmitted from a base station.

SUMMARY OF THE INVENTION

The present invention comprises a system which dynamically adjusts the power of signals transmitted from a wireless base station over global channels to minimize spillover to other communication cells. The system monitors the total transmit power of the base station and dynamically adjusts the global channel transmit power as a function of the total transmit power of the base station as measured at the base station.

Accordingly, it is an object of the present invention to provide an improved method and system for dynamically controlling the transmit power of signals transmitted from a base station over global channels to minimize spillover to adjacent cells.

Other objects and advantages of the present invention will become apparent after reading the detailed description of presently preferred embodiment.

DETAILED DESCRIPTION OF THE PREFERRED EMBODIMENT

Figure 1:
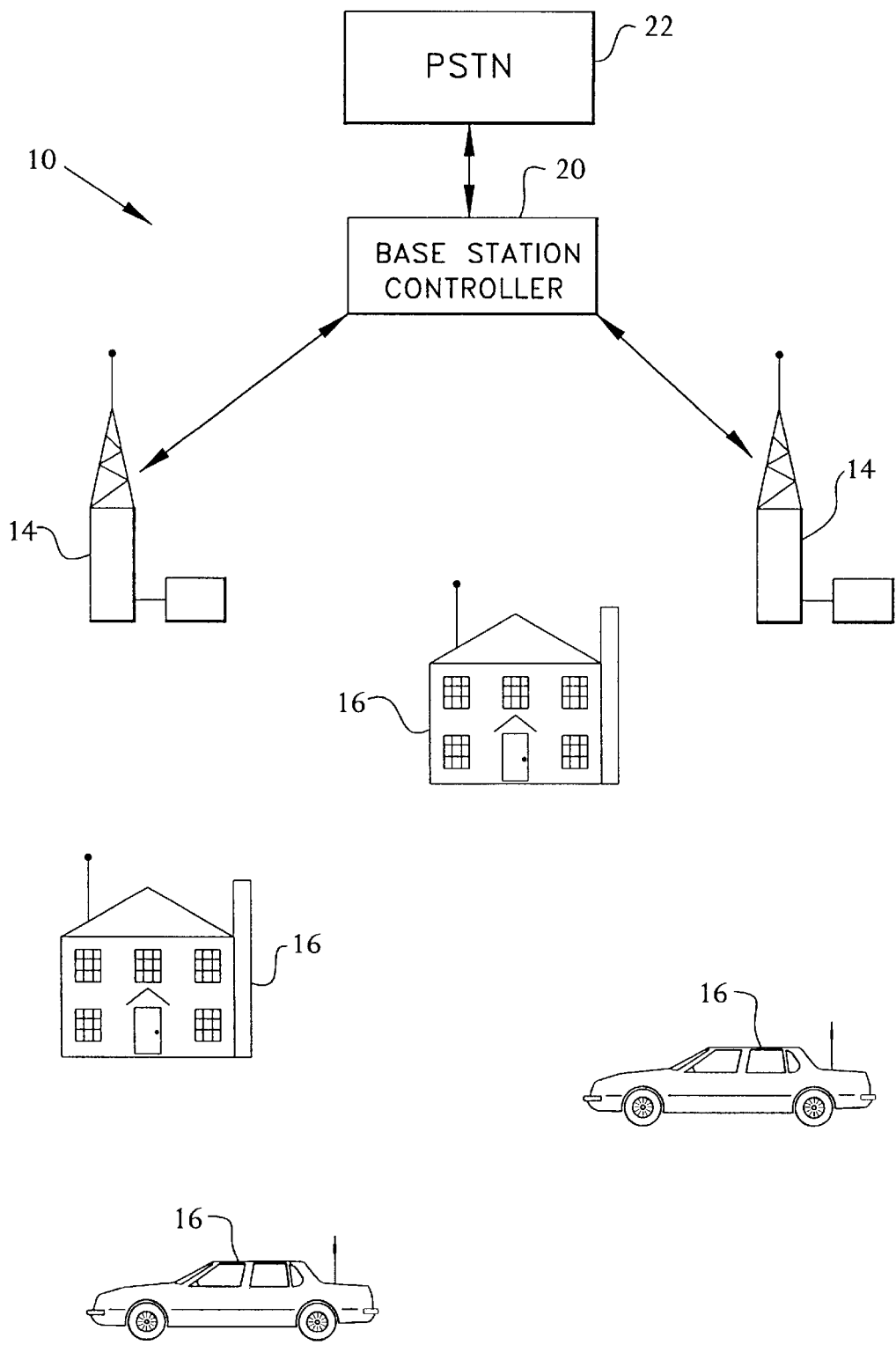
FIG. 1 is a communication network embodying the present invention.

The preferred embodiment will be described with reference to the drawing figures wherein like numerals represent like elements throughout.

A communication network 10 embodying the present invention is shown in FIG. 1. The communication network 10 generally comprises one or more base stations 14, each of which is in wireless communication with a plurality of fixed or mobile subscriber units 16. Each subscriber unit 16 communicates with either the closest base station 14 or the base station 14 which provides the strongest communication signal. The base stations 14 also communicate with a base station controller 20 which coordinates communications among base stations 14 and between base stations 14 and the subscriber units 16. The communication network 10 may optionally be connected to a public switched telephone network (PSTN) 22, whereupon the base station controller 20 also coordinates communication between the base stations 14 and the PSTN 22. Preferably, each base station 14 is coupled with the base station controller 20 via a wireless link, although a land line may also be provided. A land line is particularly applicable when a base station 14 is in close proximity to the base station controller 20.

The base station controller 20 performs several functions. Primarily, the base station controller 20 provides all of the operation, administration and maintenance (OA&M) signaling associated with establishing and maintaining the communications between the subscriber units 16, he base stations 14 and the base station controller 20. The Base station controller 20 also provides an interface between the wireless communication system, 10 and the PSTN 22. This interface includes multiplexing and demultiplexing of the communication signals that enter and exit the system 10 via the base station controller 20. Although the wireless communication system 10 is shown as employing antennas to transmit RF signals, one skilled in the art should recognize that communications may be accomplished via microwave or satellite uplinks. Additionally, the functions of a base station 14 may be combined with the base station controller 20 to form a master base station. The physical location of the base station controller 20 is not central to the present invention.

Figure 2:
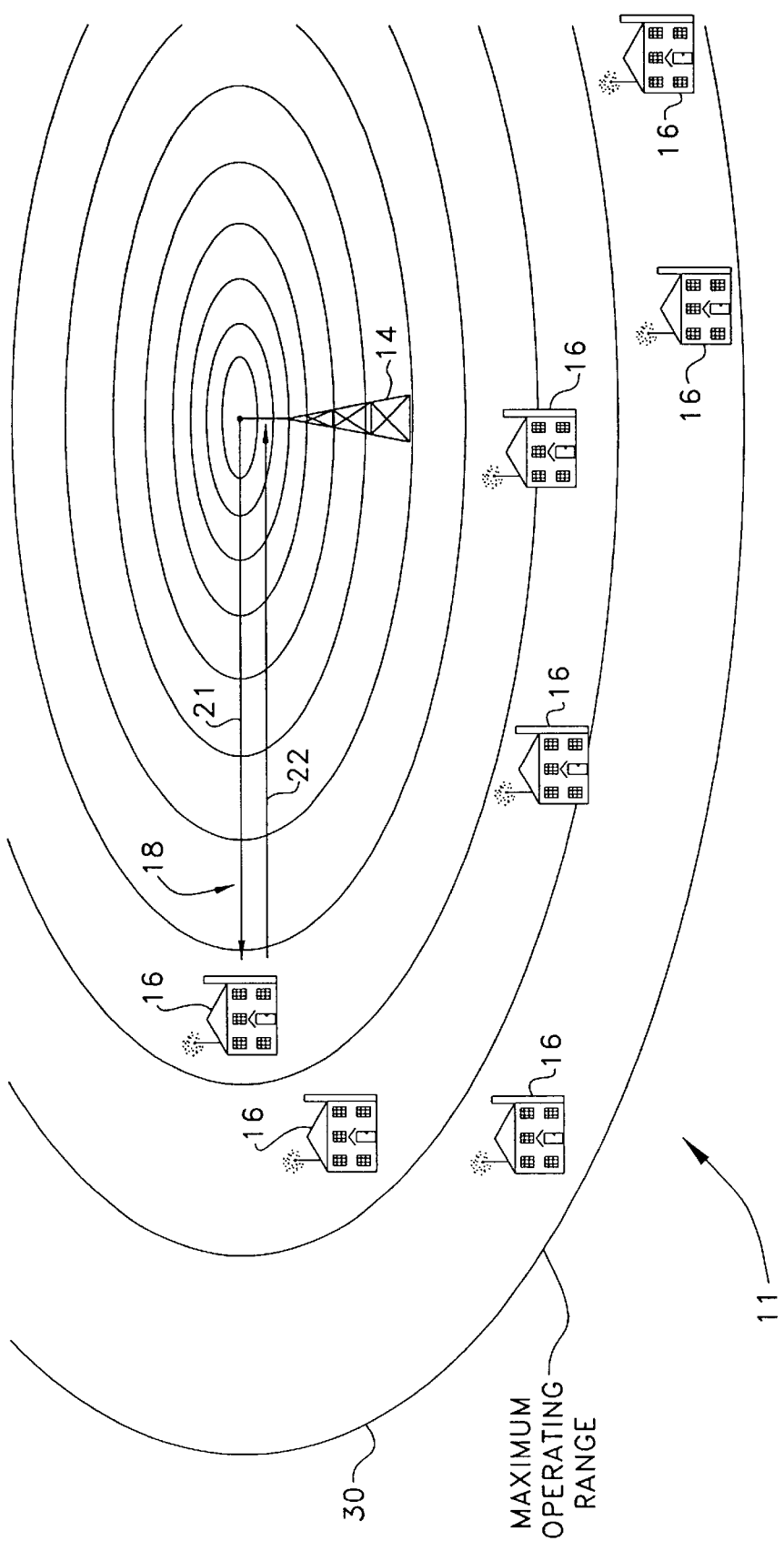
FIG. 2 is the propagation of signals between a base station and a plurality of subscriber units.

Referring to FIG. 2, the propagation of certain signals in the establishment of a communication channel 18 between a base station 14 and a plurality of subscriber units 16 is shown. Forward signals 21 are transmitted from the base station 14 to a subscriber unit 16. Reverse signals 22 are transmitted from the subscriber unit 16 to the base station 14. All subscriber units 16 located within the maximum operating range 30 of the cell 11 are serviced by that base station 14.

Figure 3:
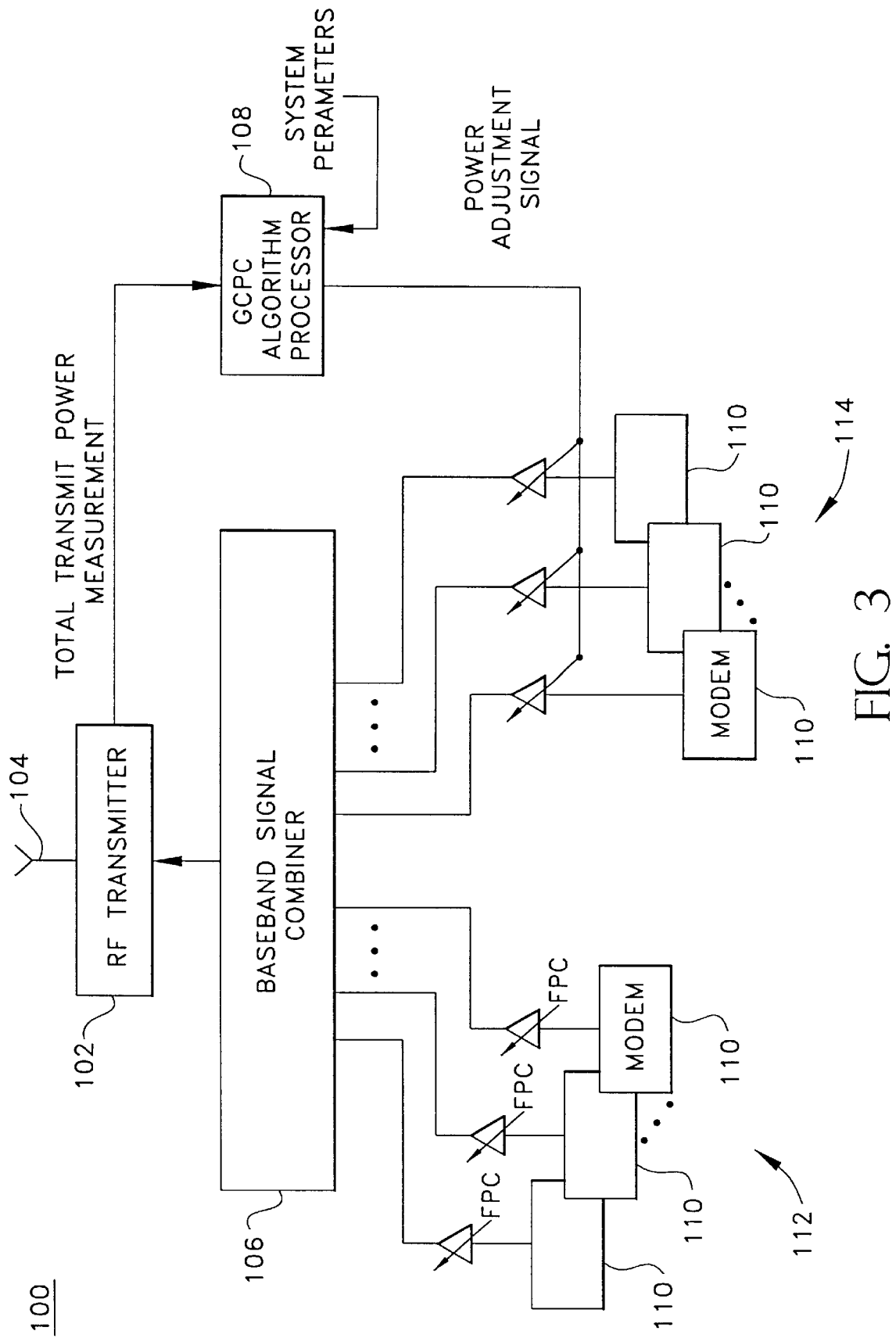
FIG. 3 is a base station made in accordance with the present invention.

Referring to FIG. 3, a base station 100 made in accordance with the present invention is shown. The base station 100 includes an RF transmitter 102, an antenna 104, a baseband signal combiner 106 and a global channel power control (GCPC) algorithm processor 108. The base station 100 also includes a plurality of modems 110, one for each channel, for generating a plurality of assigned channels 112 and a plurality of global channels 114. Each modem 110 includes associated code generators, spreaders and other equipment for defining a communication channel as is well known by those skilled in the art. Communications over assigned and global channels 112, 114 are combined by the combiner 106 and upconverted by the RF transmitter 102 for transmission. The power of each assigned channel 110 is individually controlled by the FPC. However, in accordance with the present invention, the power of the global channels 114 is simultaneously and dynamically controlled by the GCPC processor 108.

The total transmit power of all channels 112, 114 is measured at the RF transmitter 102 and this measurement is input into the GCPC processor 108. As will be described in detail hereinafter, the GCPC processor 108 analyzes the total transmit power of all channels 112, 114 and calculates the desired transmit power level of the global channels 114. Preferably, the power level is measured prior to outputting the RF signal to the antenna 104. Alternatively, the power level may be: 1) measured at the combiner 106 2) sampled at each assigned and global channel 112, 114 and summed; or 3) received as an RF signal just after transmission using a separate antenna (not shown) co-located with the base station antenna 104. Those skilled in the art should realize that any method for monitoring the total transmit power at the base station 100 may be employed without significantly departing from the spirit and scope of the present invention.

Dynamic control of the power of global channels 114 is performed by using several assumptions in analyzing the total transmit power. It is assumed that the FPC for the assigned channels 112 is working ideally and the power transmitted to each subscriber unit 16 is adjusted so that all subscriber units 16 receive their signals at a particular signal-to-noise ratio. Since changing the transmit power to a particular subscriber unit 16 affects the signal-to-noise ratio seen at other subscriber units 16, the analysis of transmit power by FPC for each assigned channel 112 is preferably performed continuously. Alternatively, the analysis may be performed on a periodic basis, as appropriate, to adjust the power for each assigned channel 112.

Prior to the analysis of the total transmit power, several factors must be defined: $\gamma$ denotes the signal-to-noise ratio required at a subscriber unit 16, $N_o$ the white noise power density, W the transmit bandwidth and N the processing gain. The propagation loss is such that if the transmit power is P, the power level $P_r$ of a subscriber unit 16 located at distance r is:

$$P_r = P * \beta(r) \quad \text{Equation (1)}$$

Different propagation models may be utilized depending upon the size of the cell, such as a free space propagation model, a Hata model or a break-point model. Those of skill in the art should realize that any empirical or theoretical propagation model may be used in accordance with the teachings of the present invention. For example, the free space propagation model is used in small cells. In this model the propagation loss is:

$$\beta(r) = \frac{\alpha}{r^2} \quad \text{Equation (2)}$$

where $$\alpha = \frac{\lambda^2}{(4\pi)^2} \quad \text{Equation (3)}$$

and $\lambda$ is the wavelength of the carrier frequency. Accordingly, if the transmit power is P, the power seen at distance r is inversely proportional to the square of the distance. Thus, the power $P_r$ seen at distance r is:

$$P_r = P * \frac{\alpha}{r^2} \quad \text{(From Equations 1 and 2)}$$

When the FPC is operating on assigned channels 112, the power transmitted $P_i$ from the base station 100 to a subscriber 16 that is located at a distance $r_i$ from the base station 100 is:

$$P_i = \frac{N}{N+\Upsilon} a(r_i) + \frac{\Upsilon}{N+\Upsilon} P_T \quad \text{Equation (4)}$$

where $P_T$ is the total transmit power and:

$$a(r_i) = \frac{\Upsilon N_0 W}{N \beta(r_i)} \qquad \text{Equation (5)}$$

Since a global channel 114 must be received adequate throughout the operating range 30 of the call 11, the transmit power requirement $P_G$ for a global channel 114 becomes:

$$P_G = \frac{N}{N+\Upsilon} a(R) + \frac{\Upsilon}{N+\Upsilon} P_T \qquad \text{Equation (6)}$$

where R is the operating range 30 of the cell 11. The value of a (R) can be calculated easily for any propagation model. Accordingly, $P_G$ is a constant plus a fraction of the total transmit power $P_T$. Since the total transmit power $P_T$ is continuously monitored at the base station 100, the global channel transmit power $P_G$ is updated dynamically instead of transmitting it for the worst case, which corresponds to the maximum transmit power $P_T$ that the base station 100 can transmit.

For example, for the aforementioned free space propagation model, the propagation loss is:

$$\beta(r) = \frac{\alpha}{r^2} \qquad \text{(from Equation 2)}$$

where $$\alpha = \frac{\lambda^2}{(4\pi)^2} \qquad \text{(from Equation 3)}$$

and λ is the carrier frequency of the signal. In this model, at distance $r_i$:

$$\beta(r_i) = \frac{\alpha}{r_i^2} \qquad \text{(from Equation 2)}$$

and $$a(r_i) = \frac{\Upsilon N_0 W}{\alpha N} r_i^2. \qquad \text{(from Equations 2 and 5)}$$

Substituting R for the operating range 30 of the cell 11:

$$a(R) = \frac{\Upsilon N_0 W}{\alpha N} R^2, \qquad \text{(from Equations 2 and 5)}$$

we have $$P_G = \frac{\Upsilon}{\Upsilon+N} \frac{N_0 W}{\alpha} R^2 + \frac{\Upsilon}{\Upsilon+N} P_T \qquad \text{(from Equation 6)}$$

Therefore, using the free space propagation model, the optimum global channel transmit power is given by a constant term, which is proportional to the square of the cell radius, plus a variable term which is a function of the total transmit power $P_T$.

The significance of the presence invention can be further illustrated by the following numerical example. Suppose system parameters are given as:
γ=4 (desired signal to noise ratio)
N=130 (processing gain)
W=10×10$^6$ (transmit bandwidth)
$N_0$=4×10$^{-21}$ (white noise density)
R=30×10$^3$ m (30 km cell radius)
λ=0.1667 m (corresponding to 1.9 GHz carrier frequency).

Using the free space propagation model:

$$\alpha = \frac{(0.1667)^2}{(4\pi)^2} = 1.76 \times 10^{-4} \qquad \text{(from Equation 3)}$$

Therefore, when the total power $P_T$ transmitted from the base station is 100 watts, the global channel transmit power $P_G$ should be:

$$P_G = \left[\frac{4}{130+4}\right] \times \left[\frac{4 \times 10^{-21} \times 10 \times 10^6}{1.76 \times 10^{-4}}\right] \times (3 \times 10^4)^2 + \left[\frac{4}{130+4}\right] \times 100 =$$

3 Watts

Figure 4:
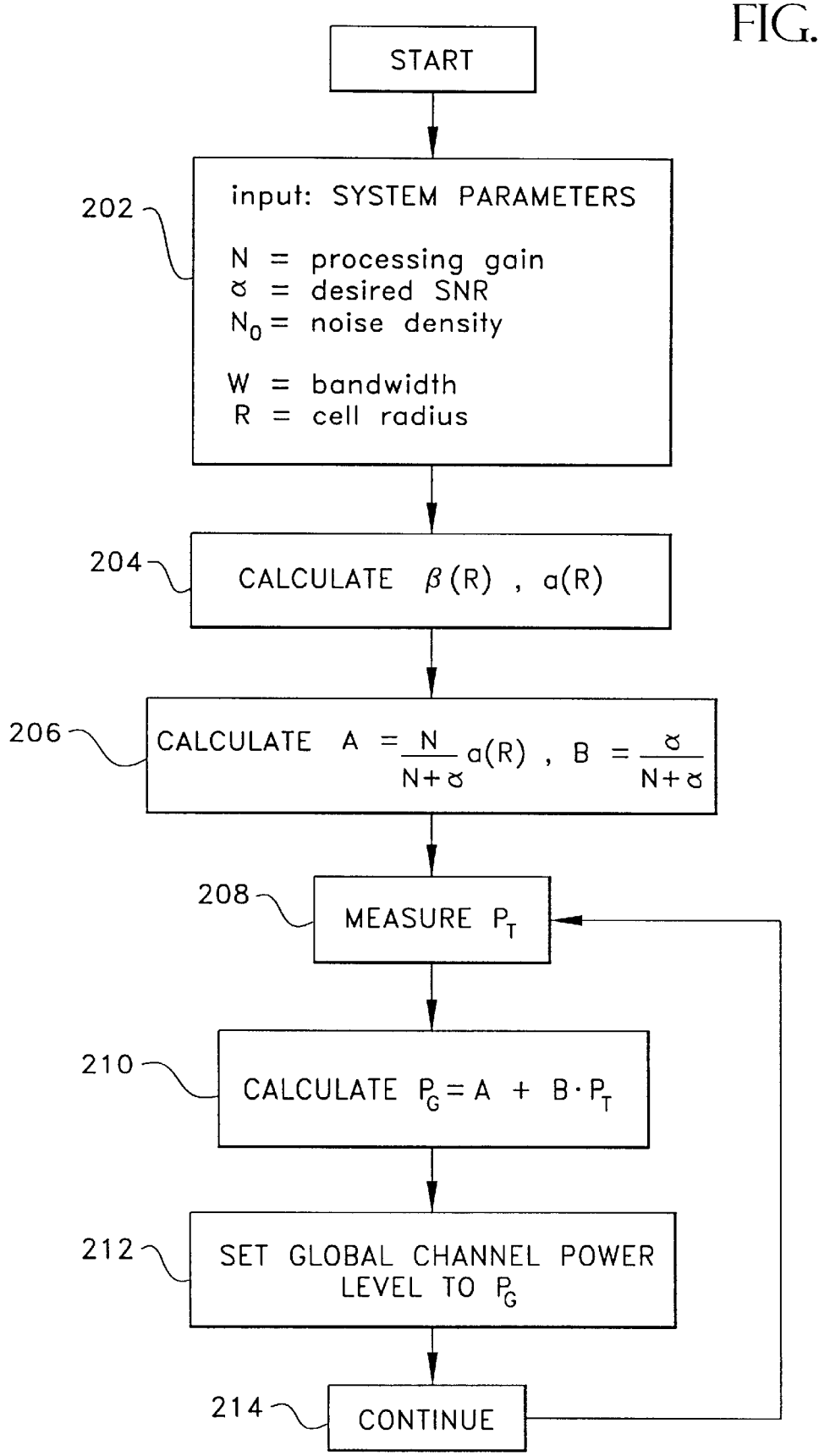
FIG. 4 is a flow diagram of the method of dynamically controlling the transmit power of global channels in accordance with the present invention.

Referring to FIG. 4, the method 200 for dynamically controlling the global channel transmit power $P_G$ is shown. Once all of the system parameters have been defined (step 202) and several constants are calculated (β(R), a(R)) (step 204), the processor 108 then calculates A and B, which are used to determine the global channel power level $P_G$ (step 206). The total transmit power is measured at the base station 100 (step 208) and the desired global channel power level $P_G$ is calculated (step 210) using the formula:

$$P_G = A + B \cdot P_T \qquad \text{Equation (7)}$$

Once the desired global channel power level $P_G$ is calculated (step 210), all of the global channels 114 are set to the calculated power level (step 212). This process is then repeated (step 214) to continually monitor the total transit power at the base station 100 to dynamically control the power level of the global channels 114.

The required transmit power for a global channel 114 can change by as much as 12 dB depending on the traffic load of the cell 11. As a result, in an application where the global channel power level $P_G$ is set such that it is sufficient under the highest traffic load expected (i.e., worst case), the global channel transmit power level $P_G$ will exceed the required power level necessary most of the time. The method of the present invention controls the global channel transmit power level $P_G$ optimally by reducing it when the traffic load is light and increasing it when the traffic load is high such that reliable communications are maintained at all times. In this manner, the spillover to neighboring cells is kept at minimum possible levels and overall system capacity is increased.

Although the invention has been described in part by making detailed reference to certain specific embodiments, such details is intended to be instructive rather than restrictive. It will be appreciated by those skilled in the art that many variations may be made in the structure and mode of operation without departing from the spirit and scope of the invention as disclosed in the teachings herein.

What is claimed is:

1. A transmitter for use in a spread spectrum wireless communication system, the transmitter transmitting a plurality of channels within a shared spectrum including a global channel, the transmitter comprising:

for each channel, a modem for producing a signal associated with that channel;

a signal combiner for combining the produced channel signals as a combined signal;

a radio frequency transmitter for transmitting the combined signal; and a global channel power control processor for determining a desired transmit power level of the global channel based on in part a transmit power level of the combined signal; and a power controller associated with the global channel for adjusting a transmit power level of the global channel to be the determined global channel transmit power level.

2. The transmitter of claim 1 located at a base station having an associated cell wherein the determined global channel transmit power level is based on in part the combined signal transmit power level and a distance to an edge of the cell.

3. The transmitter of claim 2 wherein the determined global channel transmit power level is based on in part a free space propagation model.

4. The transmitter of claim 2 wherein the determined global channel transmit power level is based on in part a data propagation model.

5. The transmitter of claim 2 wherein the determined global channel transmit power level is based on in part a break point propagation model.

6. The transmitter of claim 1 wherein the combined signal transmit power level is measured at the radio frequency transmitter.

7. The transmitter of claim 1 wherein the combined signal transmit power level is determined at the signal combiner.

8. The transmitter of claim 1 wherein the combined signal transmit power level is determined at the modems.

9. The transmitter of claim 1 wherein the combined signal transmit power level is measured at an antenna external to the transmitter.

* * * * *